US008908507B2

(12) United States Patent
Kovvali et al.

(10) Patent No.: US 8,908,507 B2
(45) Date of Patent: Dec. 9, 2014

(54) RAN ANALYTICS, CONTROL AND TUNING VIA MULTI-PROTOCOL, MULTI-DOMAIN, AND MULTI-RAT ANALYSIS

(75) Inventors: Surya Kumar Kovvali, Westborough, MA (US); Mythili Vutukuru, Secunderabad (IN); Charles W. Boyle, Upton, MA (US); Rajat Ghai, Sandwich, MA (US); John Hutchins, Groton, MA (US); Tarek Abou-Assali, Boston, MA (US); Yuyong Zhang, Nashua, NH (US); Nitin Rana, Bangalore (IN); Thirumala Venkata Gupta Araveti, Chelmsford, MA (US); Raj Sirisikar, Acton, MA (US); Gopal K. Bonthu, North Grafton, MA (US)

(73) Assignee: Movik Networks, Westford, MA (US)

( * ) Notice: Subject to any disclaimer, the term of this patent is extended or adjusted under 35 U.S.C. 154(b) by 171 days.

(21) Appl. No.: 13/555,787

(22) Filed: Jul. 23, 2012

(65) Prior Publication Data

US 2013/0021933 A1 Jan. 24, 2013

Related U.S. Application Data

(60) Provisional application No. 61/510,217, filed on Jul. 21, 2011, provisional application No. 61/561,538, filed on Nov. 18, 2011, provisional application No. 61/621,031, filed on Apr. 6, 2012.

(51) Int. Cl.
*H04W 88/18* (2009.01)
*H04W 28/02* (2009.01)
*H04W 24/08* (2009.01)

(52) U.S. Cl.
CPC .......... *H04W 88/18* (2013.01); *H04W 28/0236* (2013.01); *H04W 24/08* (2013.01)
USPC .......... 370/229

(58) Field of Classification Search
CPC ..... H04W 24/00; H04W 24/02; H04W 24/08; H04W 28/0231; H04W 28/0236; H04W 28/0247; H04W 28/0268; H04W 28/0284; H04W 28/0289; H04W 28/06; H04W 28/10; H04W 28/12
USPC .......... 370/229–232, 235, 236
See application file for complete search history.

(56) References Cited

U.S. PATENT DOCUMENTS 7,197,067 B2 * 3/2007 Lusky et al. .......... 375/224
7,590,427 B2 9/2009 Villwock et al.

(Continued)

OTHER PUBLICATIONS

3GPP TS 23.203, V12.0.0 (Mar. 2013), Technical Specification, 3rd Generation Partnership Project; Technical Specification Group Services and System Aspects; Policy and charging control architecture (Release 12), 183 pages.

(Continued)

*Primary Examiner* — Kerri Rose
(74) *Attorney, Agent, or Firm* — Nields, Lemack & Frame, LLC

(57) ABSTRACT

The present invention identifies methods and procedures for correlating control plane and user plane data, consolidating and abstracting the learned and correlated data in a form convenient for minimizing and exporting to other network devices, such as those in the Core Network and the Access Network, or the origin server, CDN devices or client device. These correlation methods may use Control Plane information from a plurality of interfaces in the RAN, and User plane information from other interfaces in the RAN or CN. IF the device is deployed as an inline proxy, this information may be exported using in-band communication, such as HTTP extension headers in HTTP Request or Response packets, or another protocol header, such as the IP or GTP-U header field. Alternatively, this information can be exported out-of-band using a separate protocol between the RAN Transit Network Device (RTND) and the receiving device.

23 Claims, 7 Drawing Sheets

(56) References Cited

U.S. PATENT DOCUMENTS

| | | | | |
|---|---|---|---|---|
| 7,843,829 | B1 | 11/2010 | Truong et al. | |
| 7,864,727 | B2 * | 1/2011 | Inayoshi et al. | 370/329 |
| 8,111,630 | B2 | 2/2012 | Kovvali et al. | |
| 8,208,430 | B2 | 6/2012 | Valmikam et al. | |
| 8,565,076 | B2 | 10/2013 | Kovvali et al. | |
| 8,576,744 | B2 | 11/2013 | Kovvali et al. | |
| 2003/0095526 | A1 | 5/2003 | Froehlich et al. | |
| 2006/0193289 | A1 | 8/2006 | Ronneke et al. | |
| 2006/0194599 | A1 | 8/2006 | Villwock et al. | |
| 2007/0293235 | A1 | 12/2007 | Inayoshi et al. | |
| 2008/0141072 | A1 | 6/2008 | Kalgren et al. | |
| 2008/0244095 | A1 | 10/2008 | Vos et al. | |
| 2008/0311855 | A1 * | 12/2008 | Manousakis et al. | 455/67.11 |
| 2009/0270098 | A1 | 10/2009 | Gallagher et al. | |
| 2009/0274161 | A1 | 11/2009 | Liu | |
| 2010/0034089 | A1 | 2/2010 | Kovvali et al. | |
| 2010/0034218 | A1 | 2/2010 | Kovvali et al. | |
| 2010/0195602 | A1 | 8/2010 | Kovvali et al. | |
| 2010/0248638 | A1 * | 9/2010 | Harada et al. | 455/67.11 |
| 2010/0291943 | A1 | 11/2010 | Mihaly et al. | |
| 2011/0136488 | A1 | 6/2011 | Kuvvali et al. | |
| 2012/0076120 | A1 | 3/2012 | Kovvali et al. | |
| 2012/0077500 | A1 | 3/2012 | Shaheen | |
| 2012/0082146 | A1 * | 4/2012 | Andreasen et al. | 370/338 |
| 2012/0099533 | A1 | 4/2012 | Kovvali et al. | |
| 2012/0120788 | A1 | 5/2012 | Hu | |
| 2012/0184258 | A1 | 7/2012 | Kovvali et al. | |
| 2012/0220328 | A1 | 8/2012 | Yu et al. | |
| 2013/0021928 | A1 | 1/2013 | Weill et al. | |
| 2013/0072222 | A1 | 3/2013 | Weill et al. | |
| 2013/0143542 | A1 | 6/2013 | Kovvali et al. | |
| 2013/0235845 | A1 | 9/2013 | Kovvali et al. | |
| 2013/0258865 | A1 | 10/2013 | Kovvali et al. | |
| 2014/0016509 | A1 | 1/2014 | Kovvali et al. | |
| 2014/0056137 | A1 | 2/2014 | Kovvali et al. | |

OTHER PUBLICATIONS

3GPP TS 29.212, V 12.0.0 (Mar. 2013), Technical Specification, 3rd Generation Partnership Project; Technical Specification Group Core Network and Terminals; Policy and Charging Control (PCC); Reference Points (Release 12), 198 pages.

International Search Report and Written Opinion mailed Oct. 16, 2012 in corresponding PCT application No. PCT/US12/47851.

Office Action mailed Sep. 12, 2014 in co-pending U.S. Appl. No. 13/679,458.

Office Action mailed Aug. 26, 2014 in co-pending U.S. Appl. No. 14/071,009.

Office Action—Restriction—mailed Dec. 26, 2013 in co-pending U.S. Appl. No. 13/183,777.

Office Action mailed May 23, 2014 in co-pending U.S. Appl. No. 13/183,777.

* cited by examiner

RAN ANALYTICS, CONTROL AND TUNING VIA MULTI-PROTOCOL, MULTI-DOMAIN, AND MULTI-RAT ANALYSIS

This application claims priority of U.S. Provisional Patent Application Ser. No. 61/510,217, filed Jul. 21, 2011; U.S. Provisional Patent Application Ser. No. 61/561,538, filed Nov. 18, 2011 and U.S. Provisional Patent Application Ser. No. 61/621,031, filed Apr. 6, 2012, the disclosures of which are incorporated by reference in their entireties.

BACKGROUND OF THE INVENTION

Wireless Mobile networks, such as UMTS, CDMA, LTE, and WIMAX, use layered network architectures that are broadly partitioned as an Access Network (AN) that deals with authorizing a user's access to a specific wireless network, his service plans, and his level of authorization (for example Adult vs. Child); and a Core Network (CN) that connects user plane sessions to the internet and other networks while enforcing the operator policies determined during the session establishment through the access network. After a session, such as a PDP Context or EPC Session, is established, the network devices in the access network, such as the NodeB, eNodeB, BTS, BSC, and RNC, are unaware of the type of application being used or the content type. These devices are also unaware of the corresponding network bandwidth/delay/jitter requirements of applications that are transported over the established user-plane tunnels. Similarly, network devices in the core network, the internet and content servers are unaware of the transit network conditions. These transit network conditions may include congestion in a specific sector, or a specific device, such as NodeB, or RNC. Other conditions include that the user may have moved to a location where the wireless coverage is poor, or the voice call volume in the specific sector/location has increased, thus reducing the available capacity in certain location. Network protocols, such as TCP, attempt to adjust to the maximum available capacity that the underlying transport could support by using end-to-end acknowledgements. However, each of these TCP sessions is unaware of other sessions in that sector or congestion point. Moreover, all of the TCP sessions associated with a specific UE, or with multiple UEs in the same sector, NodeB, or RNC may not be traversing the same Core Network devices, such as SGSN, or GGSN. Attempts by each TCP session to maximize network usage may not be suitable for certain applications and other TCP connections through the same congestion point.

As stated above, the congestion of the radio access network (RAN) is a major concern for operators of high-speed 3G networks. The problem is further exacerbated by the proliferation of smart phones and USB dongles to laptops that drive increasingly large amounts of data through the network compared to the older handsets. Such congestion could be due to small number of users running high bandwidth applications or due to the increased number of circuit switched (CS) users in a sector, the increased number of packet switched (PS) sessions, increased signaling rates in control plane (CS or PS), increased SMS or MMS usage during events or frequent RAB establishment and releases by certain devices or applications. In addition to congestion, wireless channel quality for a subscriber, which changes rapidly with mobility or due to contention with other users in the same sector/site, also makes it difficult for applications to deliver traffic consistently through the Radio Access Network (RAN). Devices in the RAN, such as NodeB, eNodeB, and RNC, are responsible for establishing user plane sessions (circuit switched or packet switched) and delivering packets to the established session by managing RAN/RF resources. These devices are unaware of the user application protocols, the network domains that the users access and the service requirements while accessing these domains. While 3GPP defines four broad categories of service classes (conversational, streaming, interactive, and background), the majority of user access patterns show conversational class for voice service, and interactive class while accessing internet. The rapid growth of mobile applications and the access density of the diverse applications in certain locations and during busy hours make the limited service classes inadequate for mobile operators to control and optimize RAN so that a user's quality of experience (QOE) is not severely degraded. Additionally, TCP/IP and the majority of applications that use TCP/IP are reservation-less protocols that use the network bandwidth to the extent that the underlying transport can support. The devices in the operator public land mobile network (PLMN) that process user application layer packets, such as TCP/IP/HTTP, and UDP, do not have the visibility of aggregation and congestion points in the operator wireless RAN. U.S. Pat. Nos. 8,111,630 and 8,208,430, which are incorporated by reference in their entireties, identify methods of placing a transparent proxy in RAN that intercepts Control Plane (CP) and User Plane (UP) in a plurality of domains (circuit switched and packet switched domains) and delivers cached content and performs other service delivery optimizations. The proxy identified in these patents proposes inline caching of accessed data and other application-specific optimizations that reduce the burden on the operator's core network, while improving the QoE of the end user.

FIG. 1 shows a sample inline network device deployed between the RNC and the SGSN. These inline network devices are usually transparent, and, when deployed outside of a base station or a radio network controller, do not have access to the congestion level within a network element or the user channel quality or the radio utilization. It is also not easy to estimate the RAN congestion level just by measuring the traffic flow to the RAN through the proxy device, because RAN capacity and user channel capacity are highly variable entities that depend on the distribution of users in the sector and the radio power allocation with voice and data among other things. However, proxies can benefit immensely from knowing the current RAN state, because they can tailor their services to the requirements of the RAN. For example, assume that a RAN cache proxy has two versions of a cached video, one in a higher resolution than the other. If the proxy could know that the user requesting the video is in a congested sector or has a bad radio channel, it can avoid overloading the RAN by serving the user with a lower resolution video. Many such optimizations are possible with an awareness of the RAN state.

Devices within the RAN, such as the RNC, NodeB, and eNodeB, deal with packet delivery over established user plane tunnels, and are unaware of the application/content types, and application needs. As described above, 3GPP standard define four service classes, (1) Conversational, (2) Streaming, (3) Interactive, (4) Background. Most application start by using the interactive service class using HTTP transport, and migrate to other application types based on user selection of a link on a web object. Additionally, the growth of mobile applications/widgets and their network usage pattern makes the above 3GPP defined services classes inadequate. More dynamic methods of identifying per flow short term network usage, longer term usage by the subscriber, subscriber-device, domain (web-site) and exporting in a consolidated way to RAN and core devices in the operator's mobile network facilitates network tuning and policy control of the network are required. This also facilitates better content adaptation for optimal QOE by the applications.

U.S. Pat. No. 8,111,630 defines methods and procedures for optimized content delivery by caching, split-TCP, transit buffering etc., in a transit network device placed in RAN that intercepts User Plane and Control plane protocols.

It would be beneficial if the transit network congestion information were propagated in a timely fashion to the core network devices that perform Policy Control Enforcement function (PCEF) or to a load balancer or to application/content delivery optimization devices. In this way, these devices could perform admittance control or video transcoding/transrating etc. functions better. Similarly, if the type of user application and its bandwidth expectations are known to devices in the RAN that are allocating Radio Resources, these devices could prioritize channel allocation based on content knowledge. Thus, it would be beneficial if there were methods that summarize the learned and estimated information from Control Plane and User Plane flows in the RAN, associate that information with sectors that they correspond to and export the consolidated information to other devices in RAN, CN, client device and Internet.

SUMMARY OF THE INVENTION

The present invention identifies methods and procedures for correlating control plane and user plane data, consolidating and abstracting the learned and correlated data in a form convenient for minimizing and exporting to other network devices, such as those in the Core Network and the Access Network, or the origin server, CDN devices or client device. These correlation methods may use Control Plane information from a plurality of interfaces in the RAN, such as IUB, IUPS-CP, IUCS-CP in UMTS, S1-AP, S11 in LTE, A9, A11 in CDMA, SIP, SDP, and User plane information from other interfaces in the RAN or CN such as IUPS-UP, Gn, Gi interfaces in UMTS, A8, A10 RTP, RTCP, HTTP in CDMA, and S1-U in LTE. The methods of exporting this information may be in-band, for example, by using HTTP extension headers in HTTP Request or Response packets, or another protocol header, such as the IP or GTP-U header field. Alternatively, this information can be exported out-of-band using a separate protocol between the RAN Transit Network Device (RTND) and the receiving device. Additionally, the RTND may be deployed on a tap interface, or may receive a copy of the user plane and control plane protocol packets in the RAN without the ability to modify the packets. In this mode, it is not deployed to intercept and alter any packet, but rather is getting only a copy of the packets exchanged between the CN device and RAN device (for example, the RNC and SGSN). In such deployments, the RTND could derive the information and summarize inference but cannot alter any flows. In such deployments, the RTND exports the learned information by consolidating information using application protocols such as XML, SNMP, GX, and others.

DETAILED DESCRIPTION

Figure 1:
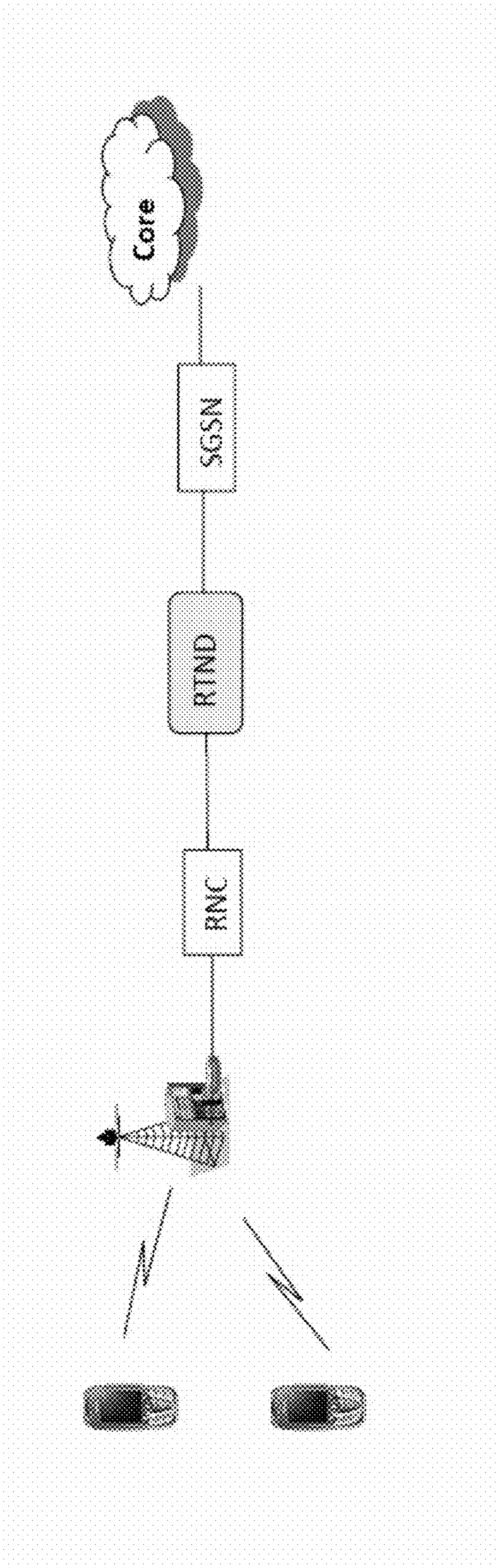
FIG. 1 is an example deployment of a transit network device (RTND) in accordance with the present invention.

As described above, the RTND of the present invention is able to monitor control plane and user plane traffic, and generate performance and other metrics based on that monitored information. These metrics can be used to implement policy control and enforcements for action when deployed as an inline proxy device or can be exported to external devices when deployed in monitoring mode. Some of the metrics that can be monitored and determined by the RTND include:

Sector Utilization level (SUL),
Sector Signaling Utilization Level (SSUL),
Subscriber Quality Index (SQI),
Subscriber Mobility Index (SMI),
and others.

For example, the SUL for a given radio sector is estimated by looking at the dataflow through the RAN interfaces, mapping application flows to subscribers, and by mapping subscribers to specific segments, such as sectors within the RAN. A sector is defined as a geographic area served by the base station and identified by the service area or sector-id in control plane. The proposed SQI metric is an estimate of individual user channel quality and computed by measuring the characteristics of traffic to the UE through the transit network device. The transit network device monitors or intercepts both and control and user planes of the RAN protocol interfaces that it is connected to.

The present invention further describes methods of grouping application flows to specific users, users to sectors, sectors to Base Stations such as NodeBs, and eNodeBs, and to event locations (such as stadiums). Using this information, the RAN transit network device can identify the traffic going to a particular network element in the RAN (such as at the granularity of a sector, NodeB, a backhaul link, or an RNC). The goal is to estimate whether a particular RAN network element or a particular aggregation point in a RAN network element is congested, and whether any given user has an acceptable channel by monitoring the characteristics of this traffic. For example, multiple sectors could be served by a base station. Thus, while a base station may not be congested, a particular sector could be congested. The set of traffic characteristics used in determining RAN congestion points, such as congested sectors and congested NodeBs, include but are not limited to:

(1) aggregate network bandwidth and the number of flows to an aggregation/delivery point such as a NodeB or a sector,
(2) historical Peak bandwidth achieved in the sector at different times of day,
(3) number of users with current active RAN resources (such as Radio Access Bearers),
(4) aggregate offered delivery rate to all the user equipment (UEs) in the target aggregation point vs. achieved delivery rate,
(5) duration of the application sessions that have been active at the specific UE, (6) receiving rate of traffic from the core network compared to the delivery rate to the UE,
(7) number of circuit switched calls active in the aggregation point,
(8) relocation and mobility procedures in Control plane,
(9) location update messages,
(10) Sector changes, and change intervals while establishing new RABS,
(11) error rates observed by TCP flows,
(12) the properties of the TCP flows to the RAN such as round trip time (RTT), and retransmission rates,
(13) control plane signaling attributes, such as signaling connection cause codes, and
(14) signaling round trip time.

The present invention also specifies the various actions that can be taken based on the estimates of RAN congestion and channel quality. When network congestion is low or UE channel quality is good, it may be possible to accelerate TCP by using a higher initial congestion window or a more aggressive TCP congestion control algorithm. It is also possible to change the quality of requested video content in accordance with the network conditions. Further, under high network congestion, it is possible to perform soft admission control, or penalize a subset of video flows, in order to improve performance for the other flows. While monitoring or intercepting circuit switched and packet switched Control and User plane protocols, the RTND of the present invention identifies network degradation, such as abnormal drops of circuit switched calls, setup failures, and degradation of specific types of packet services such as MMS, determines thresholds, performs statistical methods for correlating such failures with analyzed network variables, and estimates future failures based on trending analysis. When the RTND is deployed to monitor/intercept multiple Radio Access Technologies (RAT), it identifies user mobility from one RAT to another based on IMSI, IMEI, NAI, or user IP Address etc., identifies sector utilization levels, and uses the information to perform a local action or to export to external devices. The local or exported information or suggested actions may include:

network reconfiguration and tuning (for example to alter the boundaries of resource reservation for circuit switched vs. packet switched boundaries),
redirection of sessions to a specific RAT (for example UMTS, LTE, CDMA etc.), and
blocking of certain applications or devices or domains that are consuming, or are likely to consume (based on recent history) significant user plane or control plane resources.

In addition to exporting the summarized and estimated information, the present invention also accepts Policy Control information, or summarized information from other network devices, such as NodeB/eNodeB, MME, an external DPI or a CDN device, and uses that information to derive summarized attributes, threshold-crossings of summarized metrics, exporting metrics and suggested actions. For example, operator's PCRF may specify the prioritization and traffic control/handling methods at different levels of network congestion and the RTND enforces the defined policy, thus serving a policy enforcement function. While 3GPP/PCC architecture defines Policy Control Rules function (PCRF) and Policy Enforcement Function (PCEF), the PCEF function is performed in the Core Network by devices, such as GGSN, that terminate the user plane tunnels. The present invention defines additional distributed policy enforcement function in the access network in transit network device deployed in RAN when the device is deployed to intercept user plane protocols and has the ability to modify user plane packets or alter user packet streams. When RTND is deployed to monitor only (for example if it is deployed on TAP interface, or it is getting a copy of mirrored upstream and downstream User Plane and Control Plane packets on a specific interface in RAN), it exports the summarized information through an in-band or out-of-band mechanism to other RAN or Core Network devices.

The methods and procedures exemplified in the present invention use 3G/UMTS network with the RAN Transit Network Device (RTND) placed between the logical interfaces IUPS-CP, IUPS-UP, IUCS-CP, and IUCS-UP. However, these methods are applicable to the device placement at other locations in the Mobile Network such as, but not limited to IUB interface between NodeB & RNC, Gn interface between SGSN & GGSN, S1, S11 interfaces, and A8, A9, A10, A11 interfaces in CDMA.

The present invention also cross-correlates the Control Plane and User Plane information on per subscriber, per sector, per site (multiple sectors, carriers within a NodeB or eNodeB), or group of Sectors, such as a group of sectors covering an airport or high density area, in a plurality of Radio Access Technologies, identifies congestion/aggregation points, summarizes the information to a limited set of attributes for exporting policy control for actions within the RAN transit network device, or for exporting to external Core Network and RAN devices. These exporting methods use well-known methods such as HTTP Post, inline header enrichment of certain protocols such as HTTP, or a unique protocol between the transit network device and the receiving device. The particular transport protocol used for this export is not limited by the present disclosure. However, the methods of correlation, consolidation of large number of network attributes collected over a period to a limited set of attributes, and exportation of these attributes in a real time fashion are within the scope of the present invention. The present disclosure identifies the following methods and procedures:

(1) Summarize information extracted from Control Plane and User Plane to associate network and user information per sector, per site, and group of sites;
(2) Map the summarized information to limited attributes per common aggregation points such as: (a) Sector, (b) NodeB, (c) Group of NodeBs. The limited attributes per congestion points may include:
  a. Utilization levels in a plurality of User Planes (circuit switch or packet switched), termed Sector Utilization Level (SUL) and
  b. Utilization in plurality of Control planes, termed Signaling Sector Utilization level (SSUL).
(3) Use the extracted information to characterize the RAN state; where the RAN State includes:
  a. user plane and control plane utilization of a sector, a site that constitutes a group of sectors served by a Base Station or a geographical location, or a venue such as a game stadium that includes several sites and sectors,
  b. service area mobility index (SAMI) of the sector/site, that identifies the mobility pattern of users accessing the site. The service area mobility index of a sector or site or a group of sites is computed as a variable between 1 to 10. A value of 1 indicates that most users access the site in a stationary environment, whereas a value of 10 indicates that it is accessed in a highly mobile environment. This value is computed from the percentage of users accessing the site from the sector moving to its neighboring sectors in a systematic fashion. The RTND may estimate this by constructing the topology map as identified in copending U.S.

Patent Publication 2012-0076120, which is incorporated herein by reference in its entirety. As a subscriber moves from one Sector/Site to one of the adjacent sites in the topology map, the RTND tracks the previous and current sites. For users with active Circuit Switched calls, this is identified from location update message updates in control plane. For users with active packet sessions, this is estimated when new RABs are established, and the time interval between the RAB establishments is small (in the order of seconds), c. sector access score matrix (SASM), that defines the bandwidth or RTT buckets and the number of users getting that Bandwidth/RTT bucket, where a bucket is a range of values. Bandwidth or RTT buckets are computed by dividing the minimum and maximum bandwidth or RTT observed over a configurable observation period into linear or statistical ranges. For example, if the observed bandwidth varies between 10 kbs to 5000 kbs, this range can be divided to 10 buckets, such as 200 to 800 kbs, etc. The buckets can be created so as to be linear, nonlinear, or statistical based on average, median, and standard deviation. For each bucket (for example, bandwidth between 300 Kbs to 600 Kbs), the number of users that are currently receiving bandwidth in that window is computed. Similar computations are performed for RTT buckets.

(4) Use the extracted information to summarize per subscriber information, in abstract form; for example:

a. Subscriber Quality Index, b. Subscriber Mobility Index (SMI), c. Subscriber Usage type, d. Subscriber Service Score Index (SSSI), which is a measure of quality of service a subscriber is getting relative to others. The SSSI is estimated based on the type of service. For example, for voice calls, it is estimated based on the number of call drops, or setup failures. For SMS and MMS, it is computed as number of failures. For web/internet accesses, it is derived from object download times. For video and large objects, it is computed based on the achieved bandwidth during video download. Based on the totality of these observed parameters, SSSI is estimated as a number from 1 to 10, where 10 indicates best SSSI, and 1 is worst. and e. Subscriber Application Pattern (SAP) which identifies application usage pattern by subscribers, for example, as heavy SMS users, heavy voice users, heavy multi-domain users that use both packet-switched and circuit switched services simultaneously. SAP may be calculated as follows. If a user uses Circuit Switched Voice services only, and use of packet switched services is very limited, SAP is set to 1. If the user uses Circuit Switched voice plus SMS, SAP is set to 2. If the user uses circuit switched and packet switched services, SAP is set to 3. If the user uses Circuit Switched and Packet Switched services simultaneously (i.e. multiple RABs), SAP is set 4. The frequency of the user's use of various applications (such as packet switched services, MMS, video) may be used to increase the user's SAP. For example, if, the user is categorized as a frequent MMS user, SAP is set to 5. If the user frequently uses videos, SAP set to 6. Thus, SAP is estimated as a number from 1 to 10, and is established based on usage over a longer term observation period, (such as one or more weeks).

(5) Use the extracted information to characterize the "Device Network Utilization" (DNU) which identifies the network usage pattern by the specific class of device, where the network usage pattern includes the frequency of RAB activations and releases, the idle time of an active RAB before RAB is released and other metrics. To calculate DNU, first the type of device is determined from the IMEI extracted from control plane or from user agent string in the http header. The method of identifying device class from Control and User planes is identified in copending US Patent Publication Application 2012-0184258, which is incorporated by reference in its entirety. From the control plane, the Rab setup and release times for both CS and PS services are computed for each device class. The percentage of time the RAB is actively used will also be computed from user plane. The RAB frequency/usage pattern is then associated with corresponding device class. This may be computed as a number between 1 to 10, based on RAB setup frequency. Values greater than 5 indicate higher RAB frequency in an observation period. If the values for a number of devices of the same class are consistently high over a number of observation periods, DNU for that device type will be higher.

(6) Use the extracted information to characterize "Application Network Utilization" (ANU), which categorizes applications or application classes based on (a) bandwidth consumption, (b) frequency of RAB activations/deactivations during the use of an application, (c) average packet size, and other parameters. ANU is computed by categorizing the application class, such as by using TCP Port numbers (for example well known ports such as HTTP, FTP, SMTP), and other signatures, such as user-agent string that some applications use, or content type (for example video-id or container type). If the application class could not be determined, for example when applications use dynamic TCP/UDP ports, and the user agent string is generic, or the content is encrypted, it is marked as unknown. The bandwidth used after RAB setup, frequency of RAB setups and releases are determined from control plane. The applications are then classified based on bandwidth usage and RAB Setup frequency. ANU may be computed as a 2 tuple, where the parameters (a) bytes per RAB, and (b) RAB frequency are monitored during an observation period. The usage pattern by number of users using the application over multiple observation periods is used to determine the ANU.

(7) Use the summarized information for exporting policy for local actions if the device is deployed as an inline proxy, or export the information to external devices in the RAN or in the Core Network in a real-time manner to trigger network control, application control, for reporting and subscriber, network, device, and content analytics.

(8) Use statistical methods, such as linear regression and logistic regression, on the RAN network data to determine network behavior, such as circuit switched call degradation, call drops, call setup failures, SMS failures, MMS failures, and service degradation of packet switched sessions. Using the fitted models, predict possible future failures based on trending of the significant variables identified by the model fit, and export triggers or thresholds for corrective actions, such as denying lower priority services, or for network tuning that includes limits for PS/CS service boundaries, limits services such as Video, HD Video, high signaling traffic applications, MMS services that consume significant uplink resources or for preserving higher priority services as determined by the operator.

(9) From the signaling and user plane trends, such as increasing voice calls in a sector or group of sectors or increasing MMS/SMS messages, and substantial increase in mobility of group of users from one sector to another, identify group events such as stadium events, access while traveling by trains and other behaviors. By fitting the statistical model from previously collected data, for these events, and correlating with the corresponding observed variables, predict future behavior, such as increasing voice call drops, call setup failures, SMS failures etc., for these events. The summarized inferences are used to control delivery changes when deployed as an inline device that modifies packet flows, or to export inferences and suggestive actions to external devices when deployed in monitoring mode.

(10) From the user plane application protocols and content analysis after extracting user plane traffic and identifying the corresponding device types from control plane, identify network usage pattern, server/domain behavior, whether the corresponding subscriber accesses are tethered and export this information to external devices.

(11) Estimate mobility mode of a User, and classify the user as, (a) stationary, (b) nomadic, and (c) vehicular.

(12) Predict the mobility of one or more users based on knowledge of sector topology, and recent mobility of users from one sector to an adjacent sector; where the estimates are based on recent history, and time of day (for example, users on a train).

(13) Identify Multiple RABs corresponding to a user, for example, detect when a user has both a voice call and data session active, estimate the number of voice calls, the number of users with data sessions, and the number of users with simultaneous voice and data sessions in a sector.

(14) Identify and classify application network usage pattern, for example from periodic ad-content requests by certain game applications, and from referrer header in http request header.

(15) Use the extracted information to characterize "Trending and Flash-mob index (TFI)". In venues such as football stadiums, during the game event, there is a pattern of access by users entering the stadium, and accessing specific network services such as Voice calls, SMS, uploading pictures before the game time, during the game-time, and after the game time. When configured with venue sectors (sectors, sites corresponding a stadium), the RTND identifies the trending of applications, and exports as a TFI. TFI is a matrix of access-type, and their volume over observation intervals. For example, the access-types may be SMS, Voice call, MMS Upload, Internet access, Google-MAPS access. When the access rates of certain service types increase, RTND exports this increase using the TFI metric. The above services have different billing and revenue opportunities for an operator, and thus have differing importance for an operator. The export of TFI facilitates anticipating the increase of these services. Network tuning reconfiguration by the policy device such as PCRF may be performed. For example, during game time, MMS may be more important than internet access. Similarly, access to location based services around the venue site is more important than internet services. The export of the TFI metric facilitates a CDN/content optimization device to prioritize or cache services related to the event. Similar to planned game events in a stadium, in flash-mob scenario, a substantial increase of a service access (SMS or MMS) in a specific site or sector occur due to a sudden event in a location; for example a celebrity arrival in a location. The RTND detects abnormal increase in certain application access and exports this information using the TFI metric, which facilitates network reconfiguration by the operator to reduce access failures for those accesses.

Figure 3:
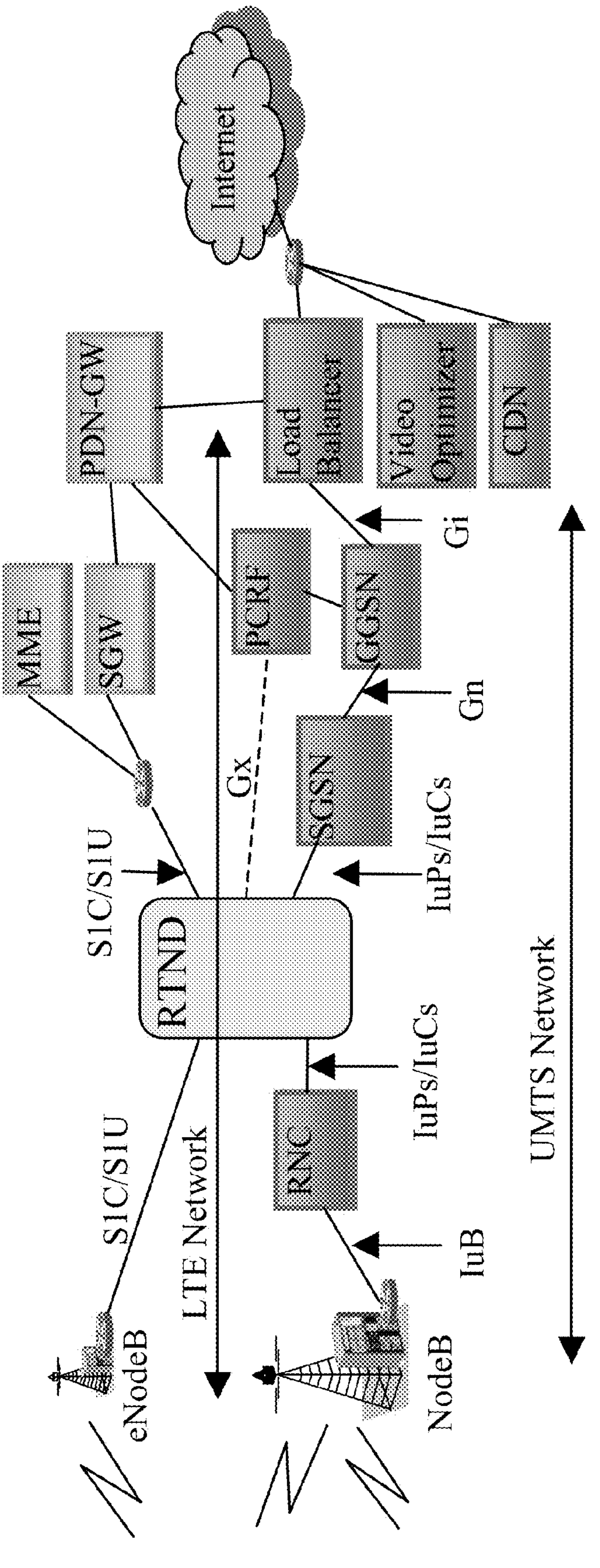
FIG. 3 shows an inline RTND deployment according to one embodiment.
Figure 7A:
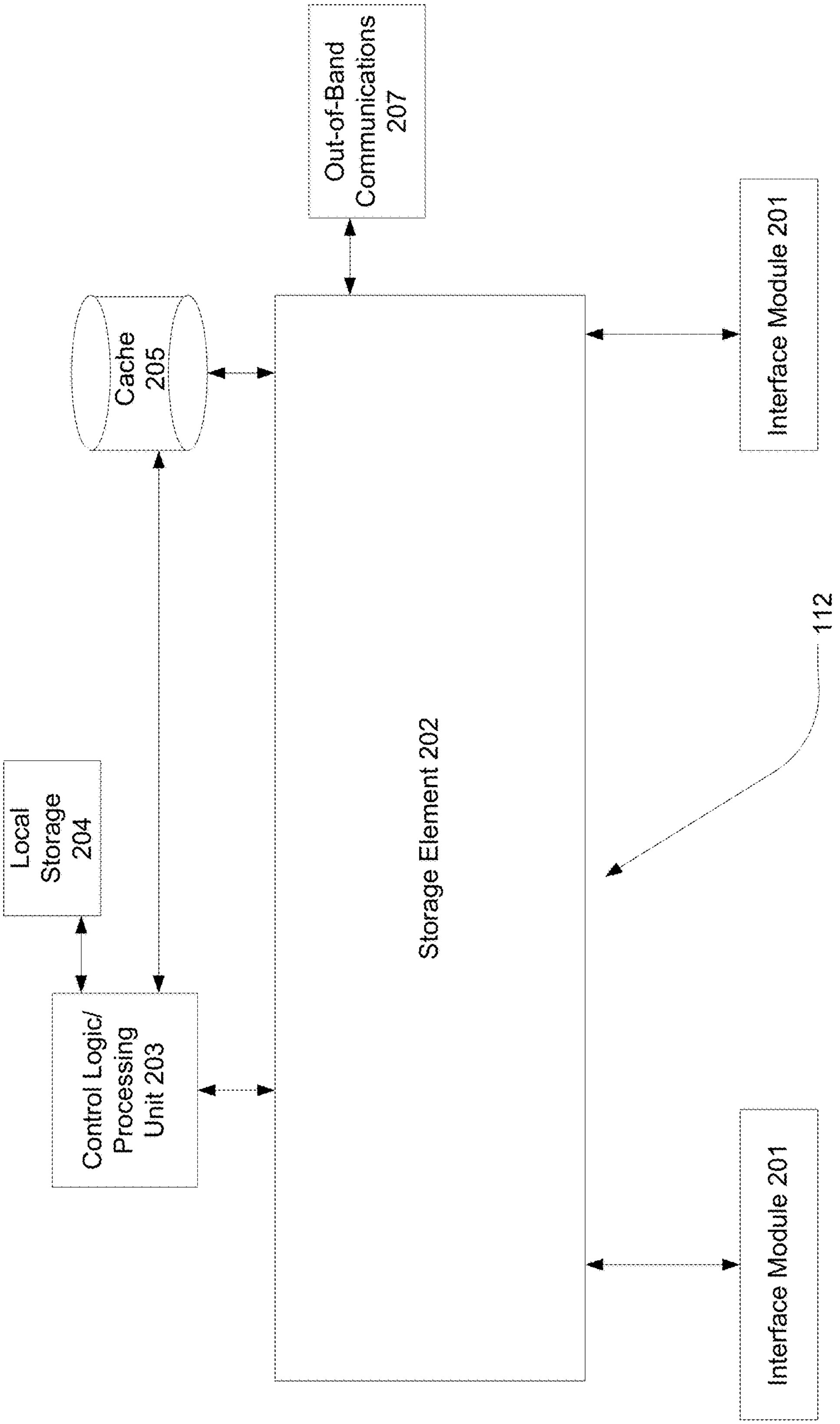
FIGS. 7A-B show representative block diagrams of the RTND according to various embodiments.

FIG. 7A shows a representative block diagram of the RTND according to the embodiment of FIG. 3. In this embodiment, the RTND 112 has two interface modules 201, each of which is adapted to implement the hardware signaling required for the choice interface and the associated software protocol. This interface protocol may be IuB, IuPS or Gn. Each interface module 201 is adapted to receive and transmit on the selected interface. Additionally, received data may placed into a storage element 202, typically a semiconductor storage element such as a RAM, DRAM or an equivalent technology. The movement of data from the interface module to the memory 202 and vice versa may be accomplished using dedicated hardware, such as a DMA controller. Alternatively, a dedicated data movement processor may be used to handle the actual movement of data through the RTND 112. Once stored within the RTND 112, the information is processed in accordance with the RAN specifications. This may be done using dedicated control logic or a processing unit 203. The control logic/processing unit 203 may have its own local storage element 204, which contains local status and instructions to execute. This storage element may be RAM or DRAM. In addition, at least a portion of this storage element 204 may be non-volatile, such as ROM, FLASH ROM, hard disk, Solid State Disk, or the like. Using known specifications and protocols, the control logic/processing unit 203 parses the received information to understand the packet at each protocol layer. In some embodiments, a large storage element 205, may be included, which is adapted to hold cached information. In some embodiments, this cache storage may be semiconductor memory, such as RAM or DRAM. In other embodiments, this cache storage may be a rotating media, such as a disk drive or other large storage device. The control logic/processing unit may be physically implemented in a variety of technologies. For example, it may be a general-purpose processor, executing a set of instructions from an internal or external storage device.

In another embodiment, a dedicated hardware device having embedded instructions or state machines may be used to perform the functions described. Throughout this disclosure, the terms "control logic" and "processing unit" are used interchangeably to designate an entity adapted to perform the set of functions described.

In some embodiments, an out-of-band communications module 207 may be incorporated in the RTND 102. This module 207 may be used to communicate information to other devices in a proprietary manner.

While in some embodiments, the RTND 112 may be inline, as shown in FIG. 3. In this embodiment, information passes from a first interface module 201 to the second interface module 201. FIG. 3 illustrates the RTND intercepting multiple network interfaces in UMTS and LTE networks. When deployed as an inline intercepting device, the RTND has the ability to modify the message contents or serve locally cached content, and therefore can perform actions based on the summarized information. Additionally, it can forward summarized information to other devices.

Figure 4:
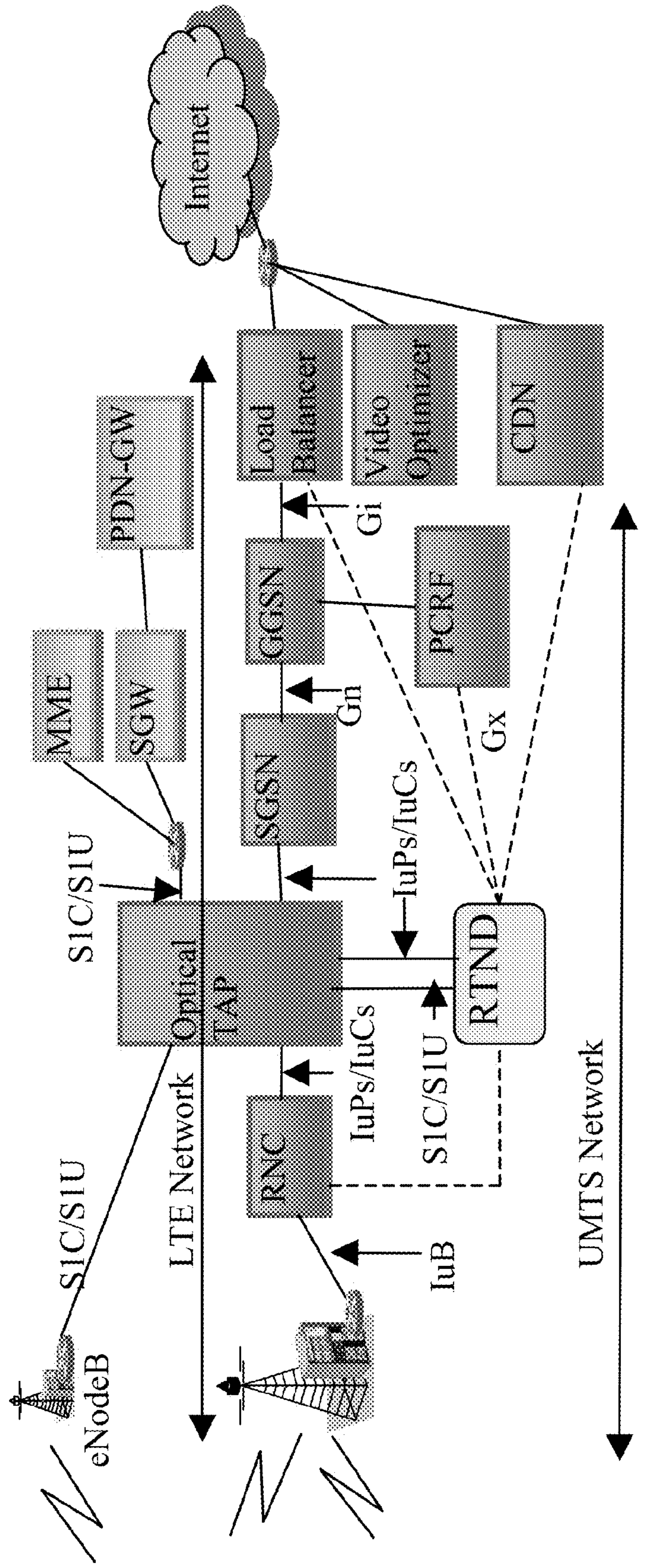
FIG. 4 shows a RTND deployment in monitoring mode using Optical-TAP in UMTS & LTE Networks according to an embodiment.
Figure 7B:
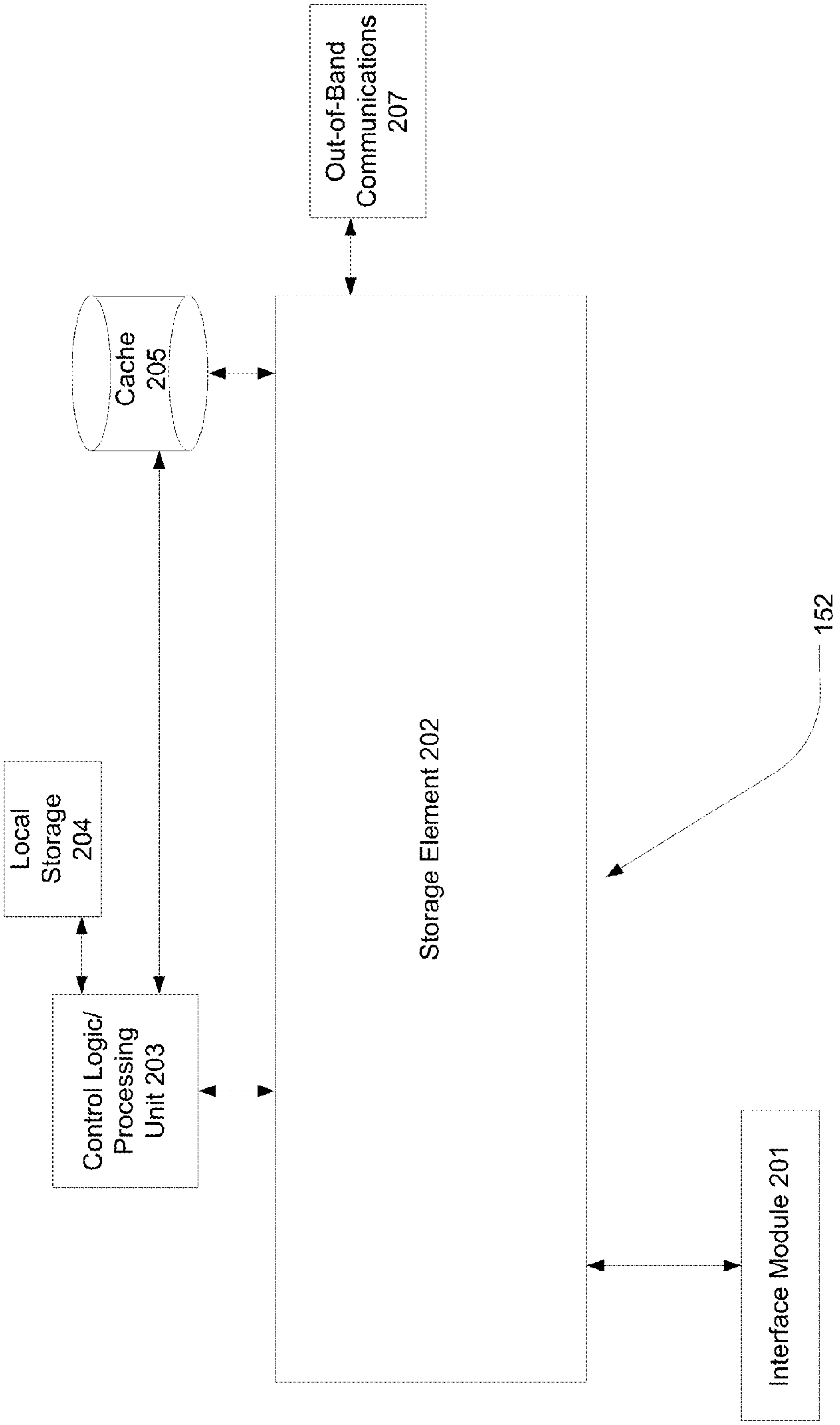

However, in other embodiments, such as is shown in FIG. 4, the RTND operates differently. As shown in FIG. 7B, the RTND 152 may have a single interface module 201, where it "listens" to all communications occurring on the interface between two adjacent devices. In this embodiment, the RTND 152 has the ability to determine state and context of the RAN, however, it is unable to modify the communications between these adjacent devices. The RTND 152 may have an out-of-band communications module 207 to transmit information to other devices. When deployed as a transparent monitoring device, as shown in FIG. 4, using an optical tap interface, the RTND is unable to modify message contents. Therefore, it exports summarized correlated information, thresholds, and suggested actions to external devices. FIG. 4 illustrates that the RTND receives traffic from IUPS, IUCS, IuB interfaces between the NodeB, RNC & SGSN in UMTS network, S1-U, S1-AP, and S11 interfaces between eNodeB, MME, and SGW in LTE Network. The Gx interface shown in both FIGS. 3 and 4 between the RTND and PCRF allows for exporting summarized information and for importing policies. The dotted interfaces in FIGS. 3 and 4 show export and import interfaces for summarized information or policies. FIG. 1 shows the RTND interfacing RAN interfaces of multiple Radio Access Technologies. While the diagram does not show other RATs such as CDMA, the methods and procedure outlined in the current invention are applicable to other RATs as well.

Figure 5:
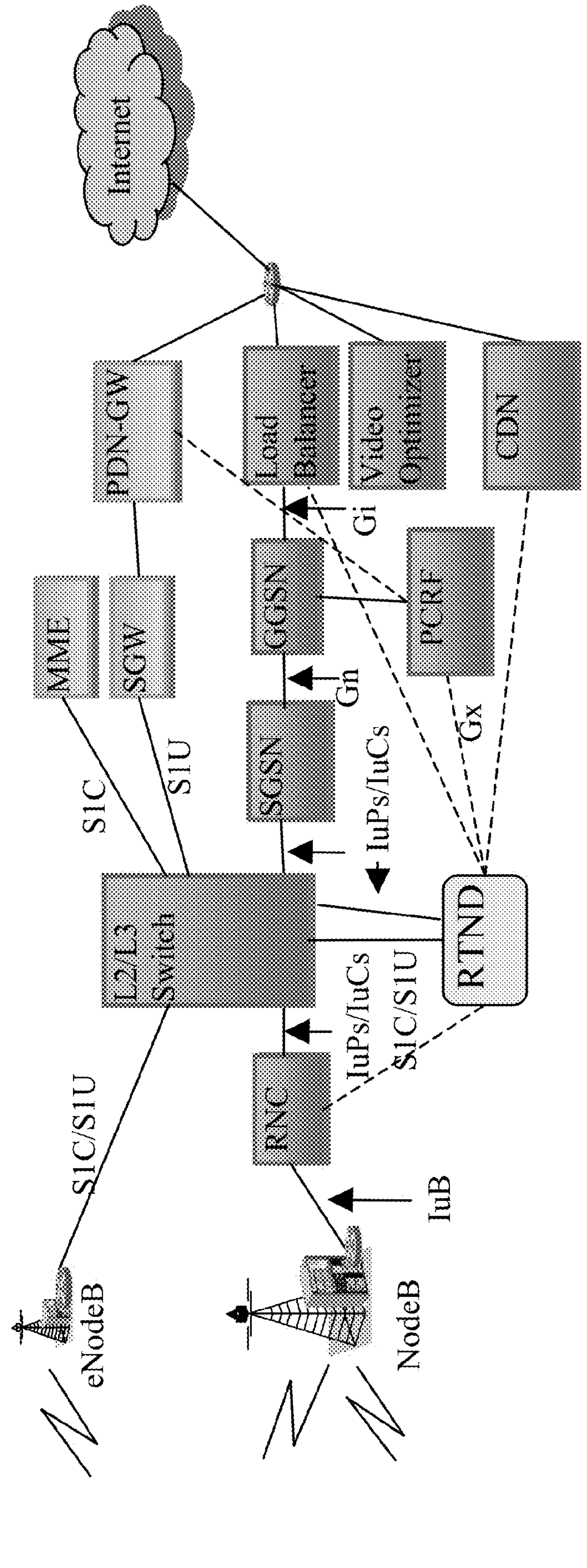
FIG. 5 shows a RTND deployment in monitoring mode using Optical-TAP in UMTS & LTE Networks according to another embodiment.

FIG. 5 shows an alternative deployment configuration to FIG. 4, in which RTND receives traffic from interfaces, such as IUCS, IUPS, S1U/S1AP etc., using port mirroring from network aggregation L2/L3 switches such as Ethernet switches, IP Routers or ATM Switches. As for stated above, the RTND is unable to modify message contents and exports summarized correlated information, thresholds, and suggested actions to external devices.

Figure 6:
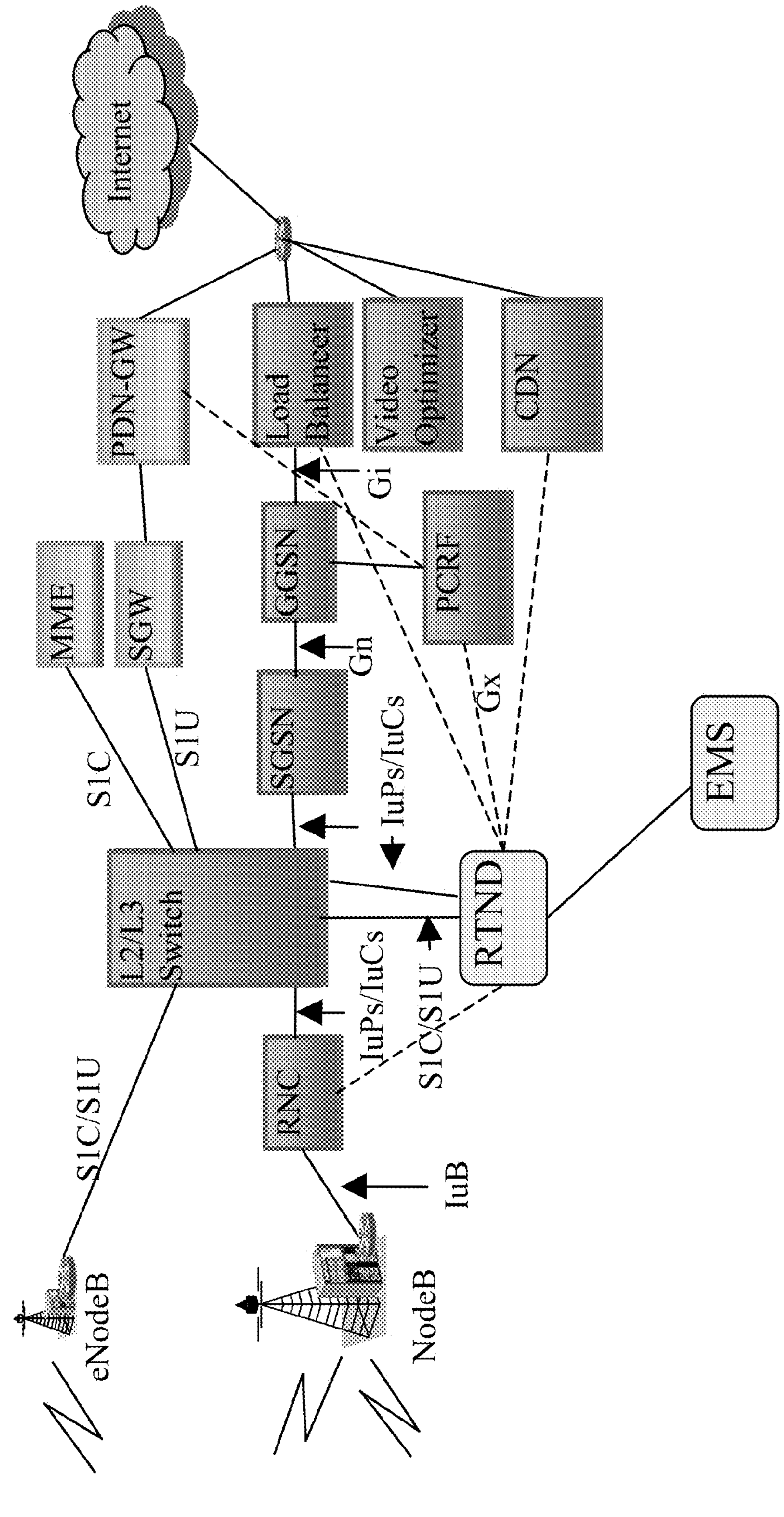
FIG. 6 shows an RTND exporting consolidated correlated information to Element Management System (EMS)

FIG. 6 shows the RTND exporting the summarized information to a presentation or a storage device for graphical presentation, and/or longer term storage and for analysis of trends. In this Figure, the RTND exports consolidated correlated information to an Element Management System (EMS). The Element Management System (EMS) is a storage and presentation device with a database management system such as Oracle, MySQL etc., for long term data collection from a plurality of RTND devices, analysis, report generation and presentation. It receives the consolidated metrics identified in the present invention and exported periodically from plurality of RTND devices. It stores the periodic metrics received, computes any policy changes back to RTND or other devices, for example, alarms for identified anomalies to external systems.

FIGS. 3-6 show a plurality of other network devices, which may be used with the present invention. As described above, the RTND may export metrics to external devices, which may take actions in response to these exported metrics. FIGS. 3-6 show some of these external devices, such as the PCRF, load balancer and CDN. 3GPP Policy and Charging Control (PCC) specification (3GPP TS23.203) defines Policy Control Rules Function (PCRF), and Policy Enforcement Function (PCEF). Typically, PCEF functions are performed in the GGSN since the user plane IP flows are encapsulated into GTP-U tunnels, therefore the rest of the network elements, such as SGSN, RNC, etc., process the GTP-U tunnels and do not process the user plane IP flows level. These general methods are applicable to other architectures such as, CDMA, although in CDMA, user flows are encapsulated into GRE tunnels instead HTP-U tunnels. Operator defines per subscriber and flow policies within PCRF. PCRF propagates these policies to one or more PCEFs when a user session is created for example, a users voice call or SMS session or PS session for internet access. The present invention extends this framework by facilitating policies at different network utilization levels (SSUL, SUL etc.), by providing utilization level close to real time to policy enforcement devices.

The Load Balancer, shown in FIGS. 3-6, distributes network load to one or more proxy, content optimization and CDN devices. Depending on the scale of an operator's network deployment, a GSSN may be processing large number subscriber flows (multiple millions of subscribers). The internet or video traffic and the corresponding content optimization functions could not be supported by a single device. In addition diverse functions, such Web-Proxy, Video Transcoding/transrating, etc., are provided in different vendor devices.

The Content Delivery Network (CDN), is a proxy, content caching device with functions, such as Edge Side Includes (ESI), that bring web-content closer to the delivery point (GGSN, PDN-GW etc.). The load balancer shown in FIGS. 3-6, distributes the user traffic from /to GGSN to the content processing devices, such as CDN, Video Optimizer etc. While the figures show CDN, Video Optimizer etc., as single block, each of these may be multiple physical devices.

Returning to FIG. 7A, the RTND also contains software capable of performing the functions described herein. The software may be written in any suitable programming language and the choice is not limited by this disclosure. Additionally, all applications and software described herein are computer executable instructions that are contained on a computer-readable media. For example, the software and applications may be stored in a read only memory, a rewritable memory, or within an embedded processing unit. The particular computer on which this software executes is application dependent and not limited by the present invention.

Using the RTND of FIG. 7A or 7B, it is possible to determine whether a RAN sector is congested. This is done by looking at the traffic to various UEs and by mapping a UE to its sector using control plane or user plane information. Similar logic can be extended to determine congestion at any other granularity in the RAN (such as the NodeB, backhaul, or RNC). Sector congestion estimation is based on various factors:

- The aggregate bandwidth to the sector. While the exact sector capacity is not known, it can be approximated using the maximum aggregate sector bandwidth observed in the recent past. If the current aggregate sector capacity is close to this observed maximum, it can be concluded that the sector is congested. However, this approach may not be fool proof in the absence of accurate knowledge of sector capacity. As a result, other traffic characteristics may be considered as well in determining sector congestion.
- Average TCP RTT. When a sector is congested, the average RTT of all the flows to that sector increases due to an increase in queuing delay. By monitoring the RTT of flows to a sector, it can be inferred when a sector is congested. Note that this heuristic does not require any apriority knowledge of the RAN, such as RAN capacity or any other configuration parameters. Also note that by averaging the RTT of all flows in a sector, robustness to estimation errors in a single flow is improved.
- Average TCP retransmission rate. When a sector is congested, TCP flows experience an increase in packet losses, resulting in an increase in the number of retransmissions seen. By monitoring the average retransmission rate of flows, the RAN transit network device can infer if a sector is overloaded or not.
- Number of RABs. The number of radio access bearers (RABs) allocated in the sector indicates the level of user activity in the sector, and can be used as an indicator of sector congestion. The activation and deactivation of RABs in a sector can be learned by monitoring the signaling and/or by learning new user plane tunnels. Otherwise, the number of RABs can be approximately estimated from the number of active UEs sending data.

Number of CS RABs. The number of circuit switched calls active in a sector, along with the number of packet switched sessions active, plus the upstream and downstream bandwidth, provide an indication of congestion.

Handover Rates & types of Handovers. By monitoring the control protocol and identifying handover messages, setup failures, and corresponding cause codes such Directed Retries, Setup failures, congestion can be estimated.

Sector congestion can be measured using a sector utilization level (SUL) score, which may be a number between 1 and 5. A value of 1 indicates that the sector is lightly utilized, while a value of 5 indicates that the sector is heavily utilized. Each of the factors listed above may be used to compute an SUL score as follows. To compute an SUL score using an indicator, such as aggregate sector bandwidth, the average value of the aggregate sector bandwidth is compared to the maximum and minimum values computed in the recent past. If the average is closer to the maximum, a higher SUL score is assigned. In this way, an individual SUL score using each of the above factors is computed. A weighted average SUL of these individual SUL scores is computed, where the weights of each factor are based on an estimate of the relative importance of each of these individual indicators in estimating congestion. This weighted average SUL can be used as a measure of sector congestion by the various proxy mechanisms. These weights may be estimated by fitting a statistical regression model on control and user plane attributes collected from the network. These weights can be learned over an observation period and applied for next period dynamically and thus form a closed loop self learning system. Additionally, certain locations such as airports, and event stadiums, have unusual patterns depending on the type of events, for example, during a basketball game event, the number image uploads using MMS could increase substantially. Similarly, at the start and end of the game, access and mobility patterns change. The RTND determines these special events, maintains alternative weights for events for differing locations, and applies alternative weights for those locations.

Similar to SUL, metric called the Subscriber Quality Index (SQI) is defined for each UE that the RTND is aware of. The SQI is a number between 1 and 3, and indicates the UE's channel bandwidth through the RAN relative to its base capacity. A higher value of SQI indicates that the UE is able to receive/send at higher data rates. The value of SQI taken together with the SUL of the sector can indicate whether the UE has good channel quality or not. When sector congestion is low, the UE's capacity to sink data depends only on its channel quality. Hence, SQI is a good measure of the UE's radio channel quality. At high sector congestion levels, a high value of SQI indicates good channel quality. However, when a UE has low SQI, it could be either due to the RAN congestion or due to bad radio channel, as these cases may be indistinguishable. The table below captures this concept.

| | Low SUL | High SUL |
|---|---|---|
| Low SQI | Bad radio channel | Bad radio channel or RAN congestion |
| High SQI | Good radio channel | Good radio channel |

The SQI of a UE can be estimated from the following factors:

Bandwidth of the UE. The average bandwidth being consumed by the UE is compared to its configured MBR or a measured long term maximum to get an estimate of how much data the UE is sinking in compared to its base capacity.

TCP RTT and retransmission rate. The average TCP RTT, RTT variance, and retransmission rate of the UE are compared with baselines of minimum and maximum values drawn from all the users in the sector. If a UE's average RTT is one of the lowest in the sector, it can be assumed that the UE has a good SQI.

Iu release cause codes. Iu release cause codes gathered from the data plane can shed light on the radio channel quality. For example, if the cause code indicates that the cause of Iu release is bad RF channel, this information may be used to assume that the UE's SQI is low.

The SQI estimates computed from the above factors are timed out according to the UE's level of activity. For example, if there is not any activity for a UE for more than a predetermined period of time, such as 10 minutes, it can be assumed that the UE's SQI estimate is stale.

When a user initiates any circuit switched or packet switched service, or SMS, the user device establishes a connection with the NodeB, or eNodeB, or RNC and the corresponding network node establishes a signaling connection (IUCS or IUPS) to the Core network to request user plane Radio Resource Bearers. This control plane activity uses Signaling Radio Bearers (SRBs) that use shared channels. Some services, such as SMS, use SRBs. Also, after user plane sessions are established, control messages for requesting resources or for communicating user mobility from one sector to another (Sector Update), and user device state transitions between different RRC states (idle, CELL_FACH, URA_PCH, DCH etc. in UMTS) use SRBs. SRBs are used for other actions as well. For example, devices in idle mode may communicate their mobility from one service area to another service area using SRBs. Similarly, the network may page a user when a new service is initiated from the network (for example, a new CS call, SMS message or email) using SRBs. As the number of users sharing a sector increases or some application when activated on specific types of devices is activated, signaling activity is generated in the control plane. As the signaling activity increases, the shared resources in the sector, for example common RF channels, or NodeB Resources or Backhaul link Bandwidth between the NodeB and RNC or eNB and MME, or resources in RNC may get congested. This congestion leads to increased session setup times, session setup failures, and increased round trip times which, in turn, increases call setup time. The present invention computes a metric termed Signaling Sector Utilization Level (SSUL) that characterizes the utilization level in the control plane. SSUL is estimated from observed Control Plane and user plane attributes, such as:

(1) Number of CS and PS sessions, (2) Rate of CS and PS sessions, (3) SMS messages, (4) Round Trip time for sending certain protocol messages to RNC and receiving corresponding Response, (5) Session Setup Failures, and the corresponding Cause Codes, etc.

Once various performance metrics are calculated, it is possible to take many actions, such as TCP acceleration (via high initial congestion window or aggressive congestion control) or selecting different resolution videos based on the network congestion state (SUL) or UE quality (SQI). In addition, it is possible to estimate network state using simpler heuristics for specific application-related network state-aware actions. One such action in the context of video traffic is described below.

When the network is congested and there are multiple high rate video flows through the RAN, all the flows may receive insufficient bandwidth and hence the quality of video suffers. That is, the user perceives stalls and QoE is low. Instead of penalizing all flows during congestion, it may be beneficial to identify a smaller subset of flows to be penalized and rate limited. By only degrading the quality of a small subset of users, the QoE of the other videos can be played without interruptions. Periodically, the set of penalized flows is shuffled in a round robin fashion, so that no user sees stalls for a long period of time. An alternative approach is to prioritize already running videos compared to newly started videos. Currently, when a TCP connection is started for a video or software upgrade, all the competing sessions sharing a congestion point attempt to distribute the available capacity, which degrades previously started videos. This new approach prioritizes those also in process, such that existing applications do not see performance degradation. Many heuristics can be used to identify RAN congestion and the number of flows to penalize to relieve the congestion. The sector congestion estimated from SUL can be a good heuristic to identify congestion. Otherwise, one can identify sector congestion by other simpler heuristics.

If the number of video flows exceeds a threshold, or a threshold fraction of the total number of flows, then penalize any new incoming video flows.

If the aggregate bandwidth of all existing video flows (measured or inferred from nominal bit rate in the video headers) is close to the estimated bandwidth of the sector, then penalize any incoming video flows.

New videos may be added to the set of penalized videos until there is an observed reduction in sector congestion. While a video is being penalized, it can be rate limited to a lower bandwidth or restricted to a lower resolution. In addition, it is possible to perform strict pacing on the video. It is also possible to configure the TCP of such videos in a conservative manner (e.g., slow growth congestion control algorithm) to avoid loading the RAN.

The previous description discloses the creations of various performance metrics. The following section describes one method that can be used to generate the values for these performance metrics.

In one embodiment, individual SUL scores are obtained using the aggregate sector bandwidth, average TCP RTT, average TCP retransmission rate, and the number of RABs in the sector. Note that the averages are computed over a 10 second period, although a different time period may be used. The minimum and maximum baseline values of these indicators are computed over the duration of a longer time period, such as a week or more. The SUL computation may be performed frequently, such as every second, using the most recent 10-second averages. Because of the choice of 10 second intervals and 1 week intervals, the arrays are sized accordingly. However, other time values can be used and the arrays may be appropriately sized to accommodate these time values.

Figure 2:
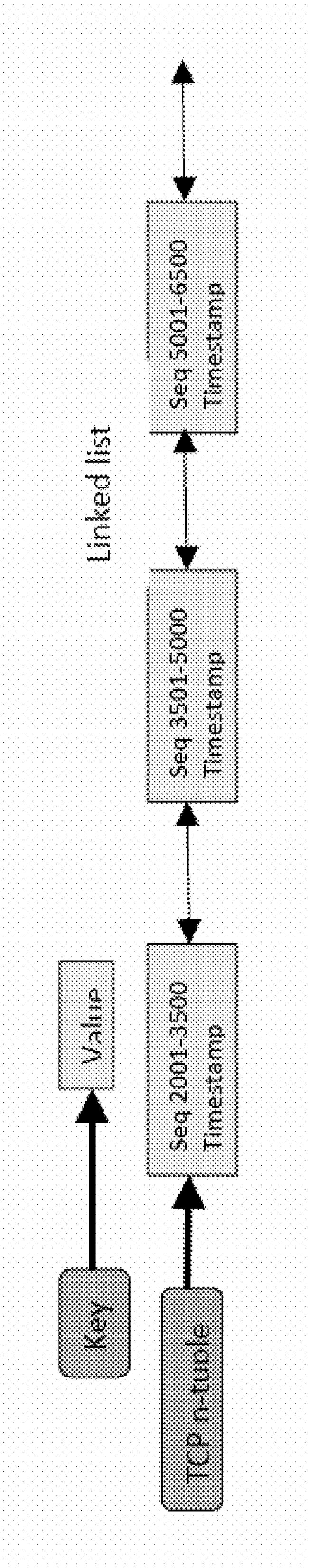
FIG. 2 shows Per-TCP connection state used to compute congestion indicators.

Per-flow state is maintained by the RTND. For every TCP flow, the RTND maintains a linked list of information on outstanding TCP segments, which are segments sent to the UE, but not yet acknowledged by that UE. FIG. 2 shows a schematic representation of such a data structure. In one embodiment, it is sufficient to maintain the sequence numbers and time that the segment was seen, separately for each TCP flow of a UE, in a list sorted by starting sequence number (i.e., there is no need to maintain the payload). When a segment arrives for a UE TCP flow, the RTND checks if it is an unseen sequence number. If it is, the RTND adds it to the linked list of sequence numbers at the appropriate sorted place. Otherwise, the RTND marks the already existing entry in the linked list as a retransmission. The RTND also maintains the time since the first segment for a UE was seen after a period of inactivity. This is used to estimate if the UE's RAB has just been allocated, and consider only UEs active for a certain period of time in computing RTT. One reason for this is that the first few packets after a RAB is allocated might experience higher than average delays, thereby biasing the computation.

When an ACK arrives from the UE, the RTND retrieves the segment with the largest starting sequence number below the ACK's sequence number (i.e., the latest segment covered by the ACK). If this segment is a retransmission, it is not used for RTT computation. Otherwise, the difference between the current time and the time this segment was sent is used as an RTT sample. Note that this mechanism handles delayed ACKs and partial ACKs automatically. When an ACK arrives, the segments covered by the ACK are also cleared from the outstanding segments linked list.

Average sector RTT may be computed in accordance with the following procedure. For each sector, and for each time interval (such as each second) in the past time period (such as 10 seconds), the RTND maintains two counts: sum of all RTTs samples in that sector during the second, and the count of these samples. That is, for i=0 . . . 9 seconds during the past time period, for each sector, there is a sum_RTT[i] and count_RTT[i] array, with the array index 0 corresponding to the current second. When an RTT sample is computed for a TCP flow (as described in the previous paragraph), the RTND looks up the sector of the UE, and updates the sum_RTT and count_RTT of that sector with this sample. When considering a sample towards the RTT sum, care is taken to ensure that the first segment of the UE was not seen in the very recent past (such as, for example, less than 1 minute ago), in order to avoid effects of very high RTTs when the RAB of a UE is first allocated. Every second, a new element of the array is reinitialized and the old values are flushed out. To compute an average sector RTT every second, the sum_RTT and count_RTT of all 10 seconds are added up and the ratio is determined.

Additionally, the RTND maintains an array of maximum and minimum sector RTT values. While computing the average sector RTT every second, the RTND updates the maximum and minimum 10-second average RTT observed per sector. The minimum and maximum are computed over an extended period, such as over the past week. For each sector, the proxy maintains an array of length 7, one entry per day, and one such array for the minimum and maximum. For k=0 . . . 6, the $k^{th}$ element of the min_RTT array denotes the minimum average sector RTT observed k days ago (k=0 corresponds to the present day). When computing average RTT every few seconds, the minimum and maximum corresponding to the current day are updated. At the end of every day, the oldest entry is flushed out and reinitialized for use for the next day.

Average sector TCP error rate is also computed by the RTND. The computation of average TCP error rate is similar to the computation of average RTT. For every sector, for each i=0 . . . 9 seconds in the past, the proxy maintains a count_total_transmissions[i] and count_retransmissions[i]. When data segments are received at the proxy, the segment is classified as a first time transmission or retransmission, and the corresponding counts are updated for the sector owning that flow. Every second, the total segments and total retransmissions of a sector are added up over the last 10 seconds, and the ratio is taken to compute the average sector retransmission rate.

Min/Max sector TCP error rate can be computed by the RTND as well. The RTND maintains the min/max average sector TCP error per day, and maintains these values for the last seven days, in order to compute min/max over the past week. The computation is similar to the min/max RTT computation. The min/max values are updated every time the average TCP error rate is computed. Note that the minimum will most likely be zero.

Average aggregate sector bandwidth can be calculated as well. For each sector, for i=0 . . . 9 seconds in the past, the RTND maintains a count of the total number of bytes sent to that sector during the $i^{th}$ second. Every time a data segment arrives in a flow, the sector of that flow is verified, and the count of the total transmitted bytes in that second of that sector is updated. A new array entry is used at the end of every second. The total number of bytes divided by the time (1 second or 10 seconds) gives the average aggregate sector bandwidth for that period.

Min/Max aggregate sector bandwidth can be calculated as well. The RTND populates and updates the one week max/min sector bandwidth values, maintained as one min/max entry per day, during the average bandwidth computation. Note that the minimum will most likely be zero.

Using the UE→sector mapping, the RTND obtains a count of the current number of active RABs in the sector every second.

Min/Max number of RABs are also tracked. The RTND populates and updates the one week max/min number of RABs, much like the min/max calculations above. Note that the minimum will most likely be zero.

For each of the variables described above (RTT, TCP error rate, sector aggregate bandwidth, number of RABs), an individual SUL score may be calculated every second on a scale of 1-5 of the variable as follows. Of course, the range of values need not be 1-5, and can any desired range.

SUL score of a variable=ceil(5*(currentAverage−min)/(max−min))

The RTND can be configured to utilize a non-linear scale that is more sophisticated than the simple linear scale above. The final SUL score may be computed as a simple average of the individual SUL scores, assuming all factors have equal importance. The weights can also be changed to be unequal based on knowledge of the operator network.

The state required to compute SQI is analogous to the state required to compute the SUL, only it is necessary to maintain all the variables (such as average RTT, minimum and maximum RTTs) at a per-UE level instead of a per-sector level. Note that the data structure that maintains outstanding segments per TCP connection can be reused in this computation as well. However, when an RTT sample is obtained from an ACK, per-UE variables must also be updated in addition to sector-level averages. Though this may result in significant extra overhead, the performance benefits from estimating SQI can justify this extra implementation and runtime overhead. For each UE, the following variables are maintained and updated, much like how the per-sector values were maintained as described earlier.

- Average RTT, average RTT variance, UE bandwidth, and average TCP retransmission rate, all computed over a 10-second window.
- Minimum and maximum values of RTT, RTT variance, and TCP retransmission rate over a week. The minimum and maximum are taken over individual UE TCP state estimates computed above, not over sector-level averages.
  - The maximum UE bandwidth is computed as its MBR or some other fixed/configured maximum.
- The time of last seen activity for each UE over any of its TCP connections.
- The Iu release cause code seen in the last 10 minutes (if any) for each UE.

Based on these monitored parameters, the SQI of a UE can be computed using the following algorithm. Of course, other algorithms can also be used and the disclosure is not limited to only this algorithm. The SQI can then be used together with the SUL to estimate the UE radio channel quality. In this embodiment, the SQI is a value between 1 and 3. Of course, the range of values need not be 1-3, and can any desired range. The following rules may be used:

- If the UE has not seen any activity in the last 10 minutes, then the SQI defaults to a value of 2.
- If the UE has seen an Iu release cause code, such as bad RF, in the last 10 minutes, then the SQI is reset to 1.
- Otherwise, the UE's SQI may be computed from TCP state and bandwidth as follows.
  - For each of TCP RTT, RTT variance, UE bandwidth, and TCP retransmission rate, an individual SQI score is computed by comparing the average values to the maximum values.
  - SQI score of a variable=ceil(3*(currentAverage−min)/(max−min))
  - A weighted average of all the individual SQI scores is computed to get the overall UE's SQI estimate.

Signaling sector utilization level (SSUL) is estimated by observing the Min, Max, Averages of several parameters, that may include:

(1) Number of CS sessions,
(2) Number of PS sessions,
(3) Number of SMS messages,
(4) Rate of CS Sessions,
(5) Rate of PS Sessions,
(6) Rate of SMS messages,
(7) Round trip time for sending certain protocol messages such as RAB-Setup message to RNC, and receiving Response message from RNC (RNC-RTT),
(8) Round Trip time for sending certain protocol message to CN and receiving corresponding response message,
(9) Call Setup failures and the corresponding cause codes.

These parameters are collected over a period of time, the min/max/avg values computed, and combined as a weighted average to compute the SSUL as a number between 1 to 5. SSUL=1 indicates low Signaling Sector Utilization, and SSUL=5 indicates high signaling utilizations. The weights are computed by observation, or by fitting statistical regression model, and using the coefficients estimated by the model as weights. Of course, the range of values need not be 1-5, and can any desired range.

Certain applications, when running on any device, or certain devices may cause heavily signaling by frequently initiating a session and releasing the session after short usage period, based on short idle timers, so as to preserve battery power in the device. One such application is Skype running on a smartphone, such as iPhone or Android. For identifying applications or domains causing high SSUL, the RTND may determine the first domain/URL, application-port type, content-type, Referrer agent etc., for new user plane sessions, and classify which applications/devices/domains are responsible for high SSUL in a sector. It is important to note that when a new PS session is initiated by an UE through the control plane, it would only be known what is the service class (interactive, background) and not which application or internet-domain access initiated the new PS session. The current invention identifies back correlating the cause for a new session based on the first domain accessed or from the user agent or referrer string, or the first web-page accessed on the new session. It exports the SSUL, and top subscriber devices, and applications causing the high SSUL.

When a user device attaches to a RAN, it sends an "Initial UE RANAP" message that contains the sector id of the RAN sector that the UE connects to. The RTND maintains neighborhood topology map from the methods identified in copending U.S. Patent Publication 2012-0076120, which is incorporated by reference in its entirety. While browsing the web, users connect to the mobile network to download a page, may read the page for tens of seconds, and request a different page or link pointed to by that previously downloaded page. During reading of the page, the user's network connection is usually idle, which causes release of the User's signaling connection to RAN, and the associated Radio Access Resources. When the user selects a new page or link, it initiates a new signaling connection using "initial UE RANAP" message that contains the new sector that the UE is located. From time difference between the previous "initial UE Message", and the new "initial UE message", and the adjacency between the corresponding two sectors, the RTND estimates the mobility index of the UE (SMI) as, (a) Stationary, (b) Nomadic, or (c) Vehicular. The difference between nomadic and vehicular is based on the estimated distance traveled between these two messages.

The tether mode of operation of a mobile device is the operation in which the mobile device, such as an iPhone or other smart phone, is configured as a gateway device for other client devices, such as Laptops, other WIFI devices etc. For example, a laptop may communicate with a smart-phone over WIFI, and the smart phone then forwards traffic received from WIFI over UMTS/LTE/CDMA network over the air and provides network service through the smart-phone operator's wireless network. Operators may provide such service with additional fees. If user configurable applications and/or setting could enable tethered mode of operation without getting service from operator, it is a loss of service. The present invention identifies tether mode, from the observed User Plane and Control Plane traffic using one or more of the following methods:

(1) The device type is identified by observed IMEI in the Control Plane, and a user agent string in HTTP indicates a user agent that is not supported on such device. For example, User Agent String indicates windows XP, and device type is iPhone.

(2) Multiple User IP addresses within the same user plane tunnels.

(3) The number of simultaneous TCP connections for HTTP Ports is well above the normal for browsers on the specific device.

(4) Multi-media content requests with types such as video container types, screen resolutions, and sizes are not known to be supported on the native device.

(5) Multiple overlapped video Requests from the same user plane tunnel in a persistent manner.

(6) Overlapped HTTP requests for top domains or to the same site.

(7) Pipelined HTTP requests and the specific device-type does not support HTTP pipelining (8) TTL value in the user plane subscriber IP address indicates value greater than 1.

(9) Full feature browser access by a feature phone that could only access wap-content.

(10) Specific applications (for example Facetime) that is not known to be supported on the type of mobile device.

On receiving information that a particular device is operating in tethered mode, the PCRF in the operator core network validates if such an operation is valid for the subscriber. Alternatively, the RTND identifies the service plan of the user, and determines if he is allowed to use tethered mode by receiving information from the PCRF or from RADIUS server. The RTND then exports information about these subscribers when they violate their service plan. When the PCRF identifies a violated tethered mode of operation, it may block the user during such access by closing his PDP sessions, or instruct the PCEF or other content optimization/load balancing devices, to limit bandwidth, or a number of TCP connections, or number of simultaneous high bandwidth applications such as videos, or content types to such subscribers.

Having computed various metrics associated with the RAN, the RTND can utilize this information in various ways. In some embodiments, the RTND exports this information to an external device, such as those described in conjunction with FIGS. 3-6, which performed an action responsive to this information. Some of the possible actions are described below. This list is not intended to be inclusive of all possible actions, rather it demonstrates the types of actions that can be carried out, based on the information gathered by the RTND.

Based on the sector utilization level (SUL), the mobile devices active in that particular sector/site/site-group, and the top UEs consuming the resources, an external device such as a PCRF, or a content load balancing device, may initiate policy enforcement functions. For example, the top consumers may be de-prioritized or rate limited to allow fair allocation of the resources in that sector/site/site-group.

When the SUL in a sector is high, and user in that sector initiates a high resolution video that consume significant sector resources, an external device may limit the bandwidth to that user, thereby increasing fairness to other user devices. The SUL indication provided by the RTND to an external content adaptation, transrating/transcoding device facilitates downgrading content bit rates, thus improving QOE for a number of users served in that sector. Alternatively, by getting real-time information of which sectors are approaching high utilization levels, when users within those sectors initiate high bandwidth or network-resource consuming applications such as HD video, software updates etc., the external device that receives the SUL indication from the RTND may do admittance control function for that application. Alternatively, it may instruct a CDN/Proxy or content/video optimization device to deny such requests when the SUL is above a given threshold.

The SUL indication, and the corresponding Sector information (Location Area/Service Area) may be used to facilitate a proxy or CDN device to serve location based content and advertisement relevant to the geographical areas that the sector LAC/SAC are serving. For example, in cases such as internet access during venues, a number of users will be accessing local content, food-stands, and user dissatisfaction will be much higher when they can't get that information quickly. On the other hand, some users may be less urgent tasks, such as getting email-syncup or downloading a windows update. These other user may use too much bandwidth in the network, thus decreasing QOE for a number of users. Thus, in this example, it may be beneficial for the proxy or CDN device to serve location based content.

As described above, the RTND can identify venue sectors (the set of sectors and sites that are serving a venue location, such as a stadium, airport, train station etc.). The RTND can also identify the mobile devices using these venue sectors. This information can facilitate reconfiguring and retuning the operator network for the services required at that venue. For example, the operator network may be retuned to support high voice call, SMS, and MMS traffic during venue-event times. To increase the capacity and coverage for the users during the venue event-time, the operator may re-configure the sites by allocating additional resources, carriers, or selecting alternative Radio Access Technologies (RATs, such UMTS/HSPA, Edge, LTE, CDMA, and Micro-Cells).

When the SUL scores for a sector are low, indicating the sector load is small, a proxy/CDN device could use Dynamic Site Acceleration methods, such as more aggressive TCP options such as high-initial congestion window, or trigger delivery of high resolution videos, thus improving the QOE for those users and/or specific sites. Similarly, when SUL score is high, the proxy/CDN device triggers the use of more conservative TCP options, lower congestion windows, and lower resolution videos.

By fitting statistical regression models for failure reasons such as voice call drops, voice call setup failures, PS session setup failures, MMS failures, SMS failures, etc., and correlating with the Sector/Site/Venue conditions in plurality of sectors, the RTND predicts the possibility of such failure when the corresponding conditions approach in real-time and exports this information when the thresholds are crossed. With this information, the external device that receives the exported information may control service interruptions, set-up failures etc., for higher priority services, by limiting packet sessions, or by limiting MMS sessions.

The export of the SQI metric from the RTND facilitates a content adaptation/video optimization device to transrate, transcode or select a low resolution video when SQI is low, or block high resolution videos or high resource consuming content, such as software downloads, when SQI is low. Similarly, this exported information enables a CDN or a web proxy to adapt web pages and web content, or to switch between WAP content and full content to improve quality of experience by end users.

As described above, the RTND can estimate and export Subscriber Mobility Index (SMI). This information facilitates an external PCRF/PCEF, content optimization or CDN device to select low resolution videos, or content adaptation based on the mobility index of the user at the time of the user request. For example when user initiates a request to watch a 10 minute video clip, or a movie, the channel quality as computed by 3GPP CQI, and the achieved TCP bandwidth at the time of the request may be high when the user is close to a base station at that instant in time. However, if the user is highly mobile (for example in a car at 70 MPH), as he travels from sector to sector, his CQI, TCP bandwidth, and other parameters continuously change, and TCP continuously tries to adjust to varying link-layer conditions. Applications, such as adaptive streaming, live streaming, smooth streaming try to adjust the application parameters, such a video resolution, bit rates etc., for the varying conditions. These methods cause significant stutters during the presentation. The SMI categorizes the user mobility as, stationary, nomadic or vehicular from recent history of usage, thus providing the external selection/optimization device a longer term view of the user mobility pattern. This allows the external device to properly select the appropriate resolution.

The RTND may export the Signaling Sector Utilization Level (SSUL), the associated users causing high signaling load, and the type of applications causing the high signaling load. This exported information facilitates the PCRF/PCEF to control or deny service when these applications are activated. For example, if the high signaling load is caused by presence detection applications, such as Instant Message (IM) service, in the venue sectors during high network usage, these requests could be blocked to reduce the signaling load. Alternatively the PCRF could trigger adjustment of timers within the Radio Access Network, such as the fast dormancy timer, which is the timer that mobile devices use to detect an idle PS session and releases RAB resources. Therefore, when SSUL is high, to reduce frequent session setups and releases, the idle timer value may be increased.

The RTND may determine the Service Area Mobility index (SAMI), which identifies specific sectors/sites, for example, train stations, stadiums, and event sites, as being highly mobile sites. This indicates that a large number of users in those sites are highly mobile. When exported SAMI information is received, the PCEF or CDN/PROXY device may prioritize the type of sites, type of content, or other parameters to the users in those locations, thus improving QOE for a number of users. Examples include limiting number of packet sessions during peak hours, or limiting the session time for users that are using for longer periods.

The RTND can determine the Subscriber Service Score Index (SSSI), which is a measure of the overall service level that the subscriber (IMSI) is getting in the site and RNC relative to other subscribers sharing the Sector/Site/Venue. This metric facilitates the operator in identifying users getting bad service, and targeting policy changes, such as servicing the specific user with release 99 channels only to accommodate frequent sector changes. 3GPP/UMTS defines Release 99 channels, which are lower bandwidth channels that handle mobility well. Alternatively, if a user is constantly getting bad service or call drops due to his location in a venue, the operator or policy function could pre-empt users getting consistent good service to improve network availability for cell-edge users.

The RTND can calculate the Subscriber Application Pattern (SAP), which characterizes the application usage pattern such as frequency, and density of voice, SMS, MMS, internet browsing, video usage, and multi-domain usage (using both circuit switched and packet switched services simultaneously). This metric can be exported and facilitates the operator to prioritize services, and plan infrastructure expansion for specific services. Additionally, this exported information facilitates a PCRF to limit subscribers that use dense services in periods of high network utilization. For example, the PCRF may limit heavy face-time application users when the SUL score in a sector is high.

The RTND can calculate and export a metric known as Device Network Utilization (DNU). This metric categorizes the network usage pattern by specific classes of devices. For example, the release of a new mobile device may increase the network access pattern by the device due to short inactive/fast-dormancy timer, or higher resolution screen or cameras. The exported DNU score facilitates a PCRF/PCEF in limiting access by high network utilization devices when the SUL or Active user count in a location is high. It also facilitates identifying the causes of network spikes/anomalies with new device introductions.

The RTND can calculate and export the metric Application Network Utilization (ANU). This is a measure of the network usage pattern by specific application or application classes. For example, Exchange mail service may wakeup periodically, establish a PS RAB to poll mail server for new mail and release the RAB. Upon receiving the ANU metric along with the SUL and SSUL metrics from the RTND, a PCRF or a Mail Server could adjust the polling intervals to reduce frequent RAB setups and releases.

Simulations have been performed showing the benefits of the methods of the present invention. Table 1 shows the simulation results for possible actions based on the performance metric, SUL. The table illustrates how rate limiting high bandwidth consuming FTP applications in a sector improves the response time, and bandwidth for other applications. The simulation is based on a traffic mix of 7 HTTP UEs, 8 video (VBR) UEs, and 5 FTP UEs. The HTTP UEs download 50 kB pages in a request, wait for an exponentially distributed duration of time with mean 0.1 s, and make the next request. VBR traffic is modeled as having periods of idle time (average duration 50 ms) alternating with periods of traffic generation (average duration 50 ms), with each period distributed according to the Pareto distribution. During the traffic generation period, the VBR source pumps in data as fast as the underlying TCP permits. FTP UEs download one large file via TCP continuously during the simulation. The RTT over the non-radio part of the link between a UE and the server is 100 milliseconds. In this embodiment, the simulation rate limits the aggregate FTP traffic to a cell to 10% of the cell capacity. No restrictions are placed on the HTTP and video traffic, with the goal of providing the best possible QoE to these interactive applications. All UEs belong to the same cell in the simulation, and each UE runs one application. The aggregate throughput of the cell was 10.4 Mbps in both scenarios. All UEs have a high channel quality. The table compares performance metrics with and without rate limiting.

TABLE 1

Example SUL action rate limiting ftp applications to improve response time and bandwidth for http, video

| Metric | Without rate limiting | With rate limiting |
|---|---|---|
| Average HTTP throughput (kbps) per UE | 226 | 253 |
| Average HTTP response time (seconds) | 1.77 | 1.56 |
| Average video throughput (kbps) per UE | 672 | 953 |
| Average delay to deliver video packets (sec) | 0.79 | 0.53 |
| Average FTP throughput (kbps) per UE | 700 | 220 |

Table 2 is an illustrative example of how the QOE of users could be improved by accelerating TCP with higher initial congestion window (cwnd) based on the SUL score of a sector and the SQI score of UEs. The simulation uses variable number of HTTP UEs downloading 50 KB objects from a server. The "think time" between requests is exponentially distributed with a mean of 100 ms. The HTTP proxy is either located within the RTND (shorter TCP-RTT of 50 msec) when it is deployed or after the packet core (TCP-RTT of 100 ms). The initial ssthresh and receiver window are set to 64 KB. In one scenario, 4 UEs are used (the network is not saturated, i.e., the TCP performance is the bottleneck). In a second embodiment, 10 UEs are used (the offered load is more than sector capacity, i.e., RAN capacity is bottleneck). High channel quality (high SQI) and low channel quality (low SQI) are simulated for each UE. To simulate higher cwnd, a UE is allowed to retain the cwnd from the previous connection to the same UE. That is, the cwnd is not reinitialized between successive HTTP data downloads to the same UE. That is, cwnd reuse in simulation is the same as setting a higher initial cwnd that reflects available bandwidth.

TABLE 2

Example action to improve user bandwidth by increasing initial tcp congestion window

| | Scenario | Without cwnd reuse (current behavior) | With cwnd reuse |
|---|---|---|---|
| 1 | 4 HTTP UEs of high SQI | 3.7 Mbps | 4.1 Mbps |
| 2 | 4 HTTP UEs of high SQI and no split TCP (longer RTT) | 2.04 Mbps | 2.9 Mbps |
| 3 | 4 HTTP UEs of low SQI | 2.02 Mbps | 2.01 Mbps |
| 4 | 10 HTTP UEs of high SQI | 8.08 Mbps | 8.05 Mbps |

The table shows that there is a 10% improvement when there are 4 UEs with high SQI. This is because of saving on the ramp up time of the successive HTTP downloads after the first one. The improvements are even more impressive (40%) when the network RTT is higher, because the impact of the ramp up is higher. However, when the 4 UEs have low SQI, cwnd reuse does not have much impact. This is because, with low channel quality, the cwnd is at lower values due to losses. Therefore, there is not much benefit from avoiding the ramp-up. So, in some sense, resetting cwnd between connections helps to make a clean start and perform slightly better. Similarly, when the network is congested, it makes sense to reset the cwnd between connections and let TCP probe for available bandwidth.

The description above defines the present invention in terms of a RTND, which may be in-line or non in-line, which is used in conjunction with other network devices in the RAN. The RTND monitors communications on one or more interfaces in the RAN, and computes performance metrics. These performance metrics are then exported to another network device, which performs some corrective or remedial action in response to these metrics.

In another embodiments, the methods described herein can be defined as a software system having a plurality of software modules, which interact together to enhance the performance, reliability, QoE or other parameters of a RAN. One of these software modules is used to monitor communications on one or more interfaces in the RAN, interpret the user and control plane information and generate performance metrics based on these communications. A second of these software modules uses these performance metrics to initiate actions, such as those listed above. In one embodiment, these software modules may be resident within a single physical device, such as an in-line proxy RTND. In other embodiments, these software modules may resident in separate devices in the network. In this embodiment, each of these software modules also includes the capability to transmit and receive information either via in-band communications or via out-of-band communications. In another embodiment, the first software module may transmit performance metrics to a plurality of second software modules, which may resident in a plurality of devices, each of which uses the performance metrics to initiate a specific action. For example, the plurality of second software modules may exist in the PCRF and CDN devices.

Each of these software modules is adapted to be executed on a computing device, and is located in a non-transitory storage element, such as a semiconductor memory device, an optical storage device, or other suitable means for storing the instructions and data used by the various software modules. As described above, these software modules may exist in a single device or in multiple devices. Therefore, in some embodiments, the first and second software modules are stored in different storage elements and are executed by different computing devices.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A RAN Transit network device (RIND) for use in a Radio Access Network (RAN), wherein said RAN comprises a plurality of devices, each having one or more interfaces connecting it to an adjacent device, said RIND comprising:

- an interface module to receive communications from one or more of said interfaces in said RAN, wherein said communications comprises control plane and user plane information;
- a out-of-band communications module to export information to one of said plurality of devices;
- a processing unit; and
- a storage element, said storage element comprising instructions adapted to:
  - interpret said control plane and user plane information received from said interface module;
  - determine one or more performance metrics based on said interpreted control plane and user plane information; and
  - export said one or more performance metrics via said out-of-band communications module from said RTND to one of said plurality of devices.

2. The RTND of claim 1, wherein said performance metric comprises a utilization level of one or more points of aggregation in said devices in said RAN.

3. The RTND of claim 1, wherein said RAN includes a base station and a sector is defined as a geographic area served by said base station and identified by a particular sector-id in said control plane, and said performance metric comprises a utilization level of said sector.

4. The RTND of claim 1, wherein said performance metrics are correlated to user equipment being used by users in said RAN.

5. The RTND of claim 1, wherein said performance metrics are correlated to applications being used by users in said RAN.

6. The RTND of claim 1, wherein said RAN includes a base station and a sector is defined as a geographic area served by said base station and identified by a particular sector-id in said control plane, and wherein said performance metric comprises a signaling resource utilization level in said sector.

7. The RTND of claim 1, wherein said RTND uses statistical methods and said performance metrics to identify a group event.

8. The RTND of claim 7, wherein said RTND transmits via said out-of-band communications module to report said group event.

9. The RTND of claim 1, wherein said RTND uses statistical methods and said performance metrics to predictively identify possible failures.

10. The RTND of claim 9, wherein said RTND transmits via said out-of-band communications module to report said predicted failure.

11. The RTND of claim 1, wherein said RAN includes a base station and a sector is defined as a geographic area served by said base station and identified by a particular sector-id in said control plane, and wherein said performance metric comprises the mobility of users in said sector.

12. A software system for monitoring the performance of a Radio Access Network (RAN) and adjusting one or more parameters based on performance metrics, wherein said RAN comprises a plurality of devices, each having one or more interfaces connecting it to an adjacent device, said software system comprising:

- a first storage element comprising a first software module, said first software module comprising instructions, executable on a computing device, said instructions adapted to:
  - interpret control plane and user plane information from one or more of said interfaces in said RAN; and
  - determine one or more performance metrics based on said interpreted control plane and user plane information; and
- a second storage element comprising a second software module, said second software module comprising instructions, executable on a computing device, said instructions adapted to:
  - perform a corrective action responsive to said one or more performance metrics.

13. The software system of claim 12, wherein said RAN includes a base station and a sector is defined as a geographic area served by said base station and identified by a particular sector-id in said control plane, and said performance metric comprises a utilization level of said sector.

14. The software system of claim 13, wherein said corrective action comprises rate limiting one or more users in said sector.

15. The software system of claim 13, wherein said corrective action comprises admittance control.

16. The software system of claim 13, wherein said corrective action comprises using a CDN device to service location based content.

17. The software system of claim 13, wherein said corrective action comprises changing one or more TCP parameters.

18. The software system of claim 13, wherein said corrective action comprises modifying resolution of content sent to one or more users in said sector.

19. The software system of claim 12, wherein said performance metric comprises subscriber quality index (SQI), and said corrective action comprises limiting resolution of a requested video by transrating, transcoding, selecting a lower resolution version or blocking of a high resolution version.

20. The software system of claim 12, wherein said performance metric comprises subscriber mobility index (SMI), and said corrective action comprises optimizing content to a user based on said SMI.

21. The software system of claim 12, wherein said performance metric comprises signaling sector utilization level (SSUL), and said corrective action comprises adjusting timers in said RAN such that sessions are not released frequently or limiting certain session types.

22. The software system of claim 12, wherein said performance metric comprises service area mobility index (SAMI), and said corrective action comprises prioritizing types of content based on said SAMI.

23. The software system of claim 12, wherein said performance metric comprises Subscriber Application Pattern (SAP), which defines the usage pattern of a user, and said corrective action comprises limiting said user when said sector utilization is high.

* * * * *